US00RE45628E

(19) United States
(12) Reissued Patent
Wu et al.

(10) Patent Number: US RE45,628 E
(45) Date of Reissued Patent: *Jul. 28, 2015

(54) DRIVING CIRCUIT OF A LIQUID CRYSTAL DISPLAY PANEL

(75) Inventors: Ming-Zen Wu, Kao-Hsiung Hsien (TW); Chien-Chih Jen, Taipei (TW)

(73) Assignee: Intellectual Ventures Fund 82 LLC, Wilmington, DE (US)

( * ) Notice: This patent is subject to a terminal disclaimer.

(21) Appl. No.: 13/403,773

(22) Filed: Feb. 23, 2012

Related U.S. Patent Documents

Reissue of:
(64) Patent No.: 7,667,245
Issued: Feb. 23, 2010
Appl. No.: 12/332,346
Filed: Dec. 11, 2008

U.S. Applications:
(62) Division of application No. 11/161,988, filed on Aug. 24, 2005, now Pat. No. 7,479,666.

(51) Int. Cl.
*H01L 23/62* (2006.01)
*G02F 1/1345* (2006.01)
*G02F 1/133* (2006.01)

(52) U.S. Cl.
CPC ..... *G02F 1/13452* (2013.01); *G02F 1/13306* (2013.01)

(58) Field of Classification Search
USPC ..... 257/207, 359
See application file for complete search history.

(56) References Cited

U.S. PATENT DOCUMENTS

| | | | | |
|---|---|---|---|---|
| 6,844,629 | B2 | 1/2005 | Chen et al. | |
| 6,879,367 | B2 * | 4/2005 | Ukita | 349/149 |
| 7,260,579 | B2 | 8/2007 | Keith, Jr. | |
| 7,479,666 | B2 | 1/2009 | Wu et al. | |
| 7,508,036 | B2 | 3/2009 | Hsu et al. | |
| 7,667,245 | B2 | 2/2010 | Wu et al. | |
| 2004/0085281 | A1 | 5/2004 | Chung et al. | |
| 2004/0150603 | A1 * | 8/2004 | Imajo et al. | 345/98 |

FOREIGN PATENT DOCUMENTS

| | | |
|---|---|---|
| CN | 1519617 | 8/2004 |
| CN | 1519617 A | 8/2004 |

* cited by examiner

*Primary Examiner* — Douglas Menz
(74) *Attorney, Agent, or Firm* — Christensen O'Connor Johnson Kindness PLLC

(57) ABSTRACT

A driving circuit of a liquid crystal display panel includes a substrate, a plurality of driver IC chips located on the substrate, a current supplier, and a first conductive wire set. The first conductive wire set has a plurality of conductive wire segments for connecting the driver IC chips in parallel to the current supplier. Furthermore, the conductive wire segments each have a form, such that paths formed of the conductive wire segments from the current supplier to the respective driver IC chips have an equal resistance, and, accordingly, each of the driver IC chips obtain the same input voltage. Hence, a problem of band mura is avoided.

27 Claims, 9 Drawing Sheets

| | Conductive wire segment A | Conductive wire segment B | Conductive wire segment C |
|---|---|---|---|
| Length (mm) | 37.2 | 11.2 | 55.6 |
| Width (mm) | 1.0 | 0.050 | 0.250 |
| Thickness ( $\mu$m) | 0.225 | 0.225 | 0.225 |
| Material | AlNd | AlNd | AlNd |

FIG. 8

| | Conductive wire segment A | Conductive wire segment B | Conductive wire segment C |
|---|---|---|---|
| Length (mm) | 37.46 | 11.6 | 57.6 |
| Width (mm) | 1.2 | 0.125 | 0.625 |
| Thickness ( $\mu$m) | 0.225 | 0.225 | 0.225 |
| Material | AlNd | AlNd | AlNd |

FIG. 9

DRIVING CIRCUIT OF A LIQUID CRYSTAL DISPLAY PANEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This [patent application] *is a reissue of U.S. Pat. No. 7,667,245, issued on Feb. 23, 2010, filed as U.S. patent application Ser. No. 12/332,346, filed on Dec. 11, 2008, which* is a divisional application of and claims priority to U.S. patent application Ser. No. 11/161,988, filed on Aug. 24, 2005, [and entitled "Driving circuit of a liquid crystal display panel"] *now U.S. Pat. No. 7,479,666, issued on Jan. 20, 2009,* the entire contents of which are incorporated herein by reference.

BACKGROUND OF THE INVENTION

1. Field of the Invention

The present invention relates to a driving circuit of a liquid crystal display panel, and more particularly to a driving circuit, in which the driver IC chips each obtain an approximately identical input voltage.

2. Description of the Prior Art

A thin film transistor liquid crystal display (TFT-LCD) panel utilizes many thin film transistors (TFTs), in conjunction with other elements such as capacitors and bonding pads, arranged in a matrix as switches for driving liquid crystal molecules to produce brilliant images. Generally, the conventional TFT-LCD panel includes an upper substrate having a color filter, a lower substrate, and liquid crystal materials between the substrates. The lower substrate comprises a plurality of scan lines (gate lines) and a plurality of signal lines (source lines) orthogonally cross over the scan lines. At least one TFT is located near the crossover of the scan line and the signal line, as a switch device for the pixel.

Please refer to FIG. 1. FIG. 1 is a schematic diagram showing a structure of a conventional liquid crystal display panel. As shown in FIG. 1, a TFT-LCD panel 10 comprises a substrate 12 and an X-printing wiring board 14. In addition, the TFT-LCD panel 10 comprises a plurality of flexible printing circuit boards (FPC) 16 for electrically connecting the X-printing wiring board 14 and the substrate 12. Source driver IC chips 18 are positioned on the side region of the substrate 12 connected to the FPC 16 and electrically connecting to the FPC 16.

A plurality of scanning lines $S_1$, $S_2$, . . . , and $S_m$ and a plurality of signal lines $D_1$, $D_2$, . . . , and $D_n$ are positioned on the substrate 12. The scanning lines $S_1$, $S_2$, . . . , and $S_m$ orthogonally cross over the signal lines $D_1$, $D_2$, . . . , and $D_n$ to define a pixel matrix (not shown) in an active region 19 on the substrate 12. In addition, the substrate 12 further comprises an outer lead bonding region (OLB) 20 and a gate driving circuit 22 positioned in the OLB 20. The gate driving circuit 22 comprises driver IC chips 22a and 22b, for outputting switch/addressing signals to the scanning lines $S_1$, $S_2$, . . . , and $S_m$. The source driver IC chips 18 are used for outputting image data signals to the signal lines $D_1$, $D_2$, . . . , and $D_n$. The driver IC chips 18, 22a, and 22b are formed on the surface of the substrate 12 by chip-on-glass (COG) technology. The driving circuit 22 comprises a plurality of conductive wires 24 for electrically connecting the driver IC chips 22a and 22b in series. The conductive wires 24 are formed directly on the surface of the substrate 12, and such design is called wiring on array (WOA).

When the liquid crystal display panel 10 is operated, a driving voltage for a controlling signal 28 is output from the X-printing wiring board 14, as shown in FIG. 1, passes through the FPC 16 and the conductive wires 24, and inputs to the driver IC chips 22a and 22b. Finally, the driver IC chips 22a and 22b output switch/addressing signals to the scanning lines $S_1$, $S_2$, . . . , and $S_m$ according to the input voltage. In addition, as shown in FIG. 2, the driver IC chips 22a and 22b are electrically connected in series. Since the conductive wires 24 produce resistances $R_1$ and $R_5$, the driver IC chip 22a has an inner resistance $R_3$, and contact points of the elements produce resistances $R_2$, $R_4$, and $R_6$, there is a relatively large total resistance.

The width of the conductive wires is broadened as wide as possible to reduce the resistance in traditional wiring techniques. The conductive wires connect ICs from the first IC to the last IC in series. However, the interface impedance between metal lines and ITO layer may be as high as 200Ω. Thus, the difference of the wiring resistance between the first IC and the wiring resistance of the last IC will be as high as 500Ω. Therefore, the driver IC chips 22a and 22b receive different input voltages when a voltage of the controlling signal 28 is applied to them, and in turn the output voltages from the driver IC chips 22a and 22b are different. The received voltage difference between the first IC and the last IC may be about 0.3V which leads the liquid crystal display panel 10 to have a band mura problem and an uneven brightness, resulting a poor display quality. As shown in FIG. 3, the display 30 is schematically shown to have a band mura.

Please refer to FIG. 4 illustrating a well known method to inhibit the band mura by adding a resistor 31 at the signal input position on the printed circuit board, such that an input signal would have an oscillating distortion with an amplitude larger than the voltage difference caused by the wiring impedance to obscure the band mura phenomenon. However, the power consumption of the entire driving circuit would be increased in such method.

Therefore, a good driving circuit of a liquid crystal display panel is still needed for giving each driver IC chip an approximately identical input voltage to avoid band mura phenomenon.

SUMMARY OF THE INVENTION

An object of the claimed invention is to provide a driving circuit of a liquid crystal display panel, such that band mura caused by different input voltages on the driver IC chips can be avoided.

The driving circuit of a liquid crystal display panel according to the claimed invention comprises a substrate, a plurality of driver IC chips positioned on the substrate, a current supplier, and a first conductive wire set. The first conductive wire set comprises a plurality of conductive wire segments for connecting the driver IC chips in parallel to the current supplier. The conductive wire segments each have a form, such that paths formed of the conductive wire segments from the current supplier to the respective driver IC chips have an equal resistance and each of the driver IC chips obtain a same input voltage.

With respect to another aspect of the present invention, the driving circuit of a liquid crystal display panel according to the present invention comprises a substrate, a plurality of driver IC chips positioned on the substrate, a current supplier, and a first conductive wire set comprising a conductive wire for electrically connecting the driver IC chips in parallel to the current supplier.

In the driving circuit according to the claimed invention, a plurality of driver IC chips are electrically connected to a current supplier in a parallel layout. Each conductive wire segment may further have a designed shape such that the resistance of each conductive path from the driver IC chip to the current supplier is almost identical, and therefore, each of the driver IC chips obtains an identical input voltage, to resolve the problem of band mura. In addition, the power consumption will not be accordingly increased. The display quality of liquid crystal display panel is hence improved.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a table showing an example of the conductive wire segment A, B, and C combination in the present invention.

FIG. 9 is a table showing another example of the conductive wire segment A, B, and C combination in the present invention.

DETAILED DESCRIPTION

Figure 1:
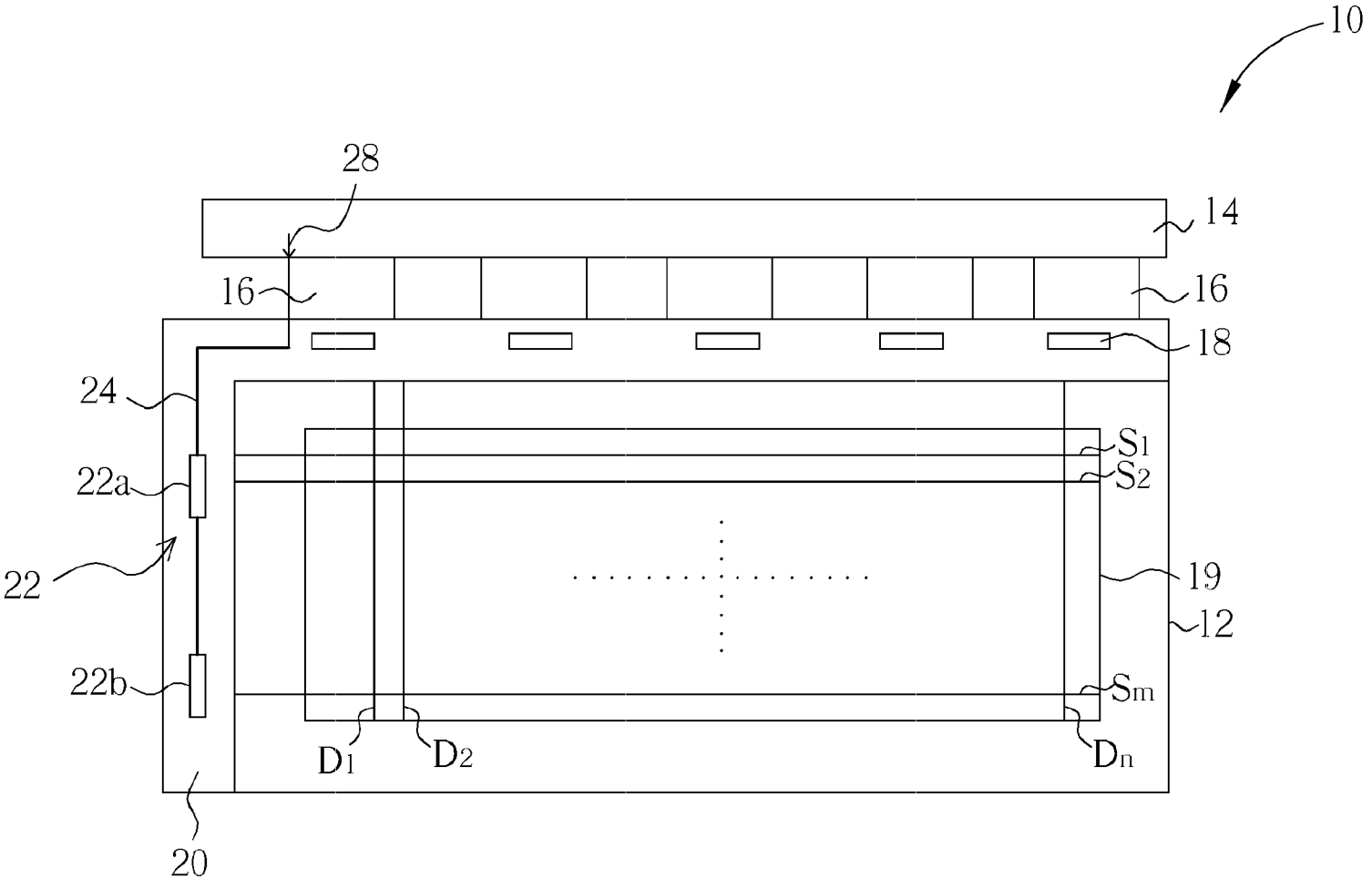
FIG. 1 PRIOR ART
FIG. 1 is a schematic diagram showing a structure of a conventional liquid crystal display panel.
Figure 2:
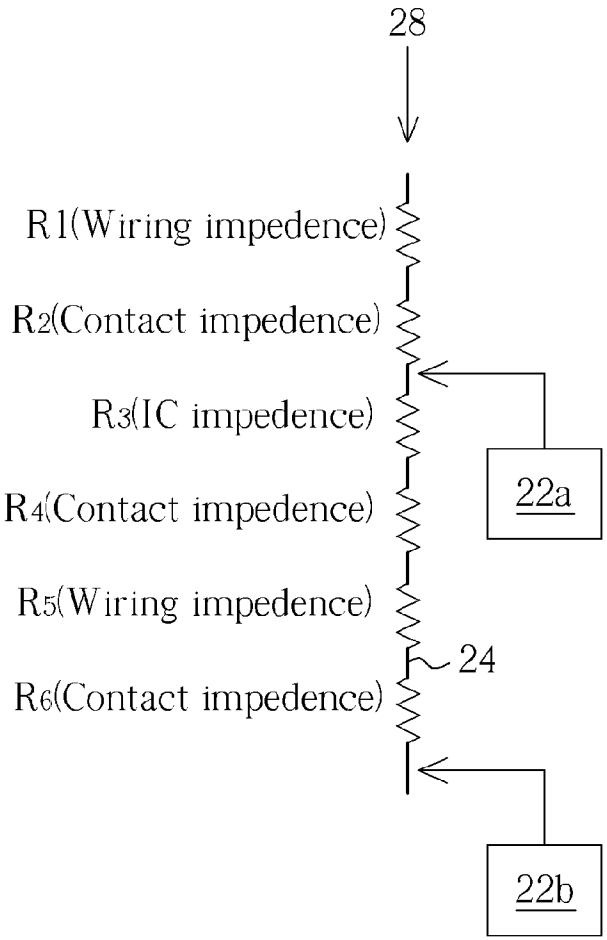
FIG. 2 PRIOR ART
FIG. 2 is a schematic diagram showing resistances produced in a driving circuit of a conventional liquid crystal display panel.
Figure 3:
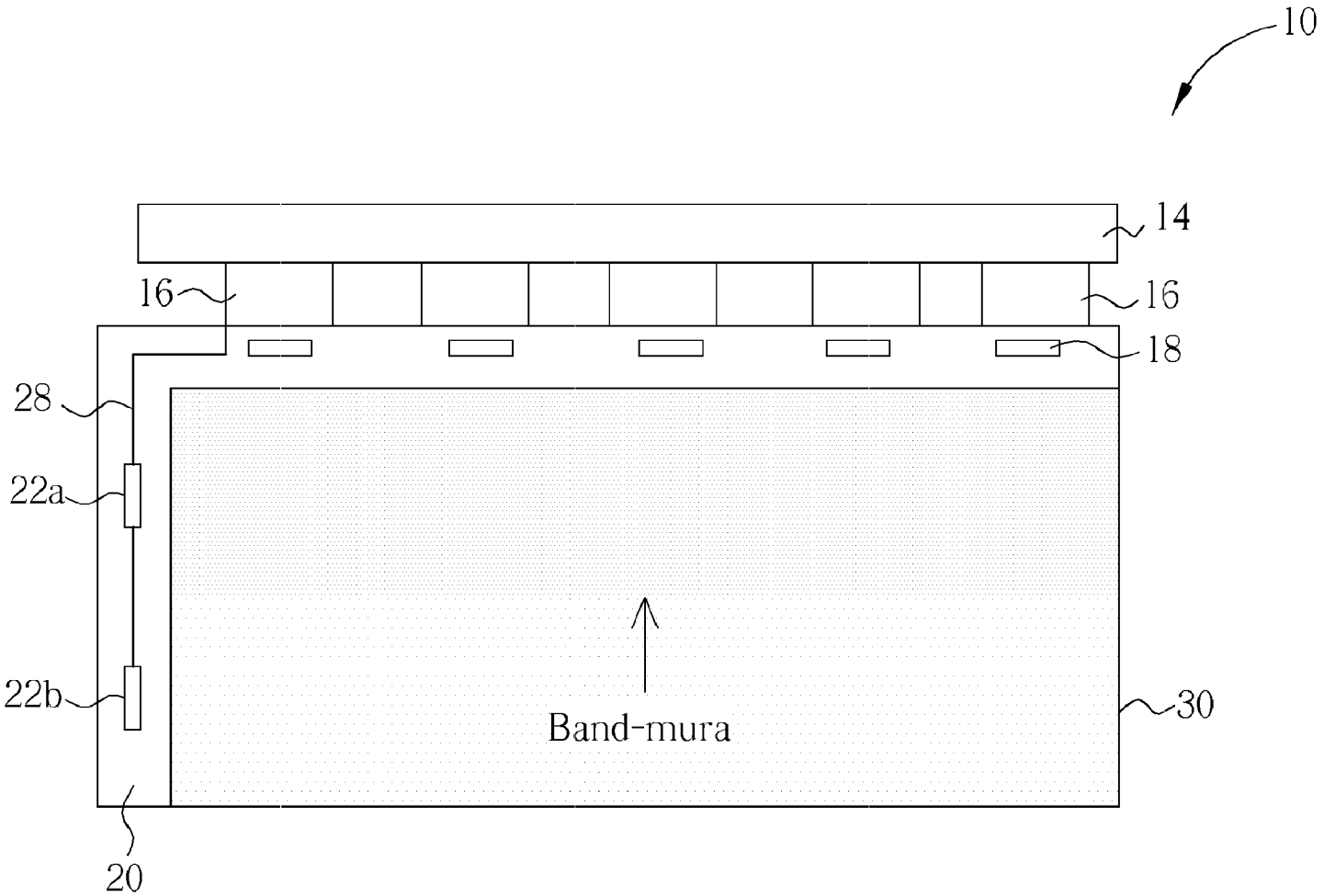
FIG. 3 PRIOR ART
FIG. 3 is a schematic diagram showing a band mura in a conventional liquid crystal display panel.
Figure 4:
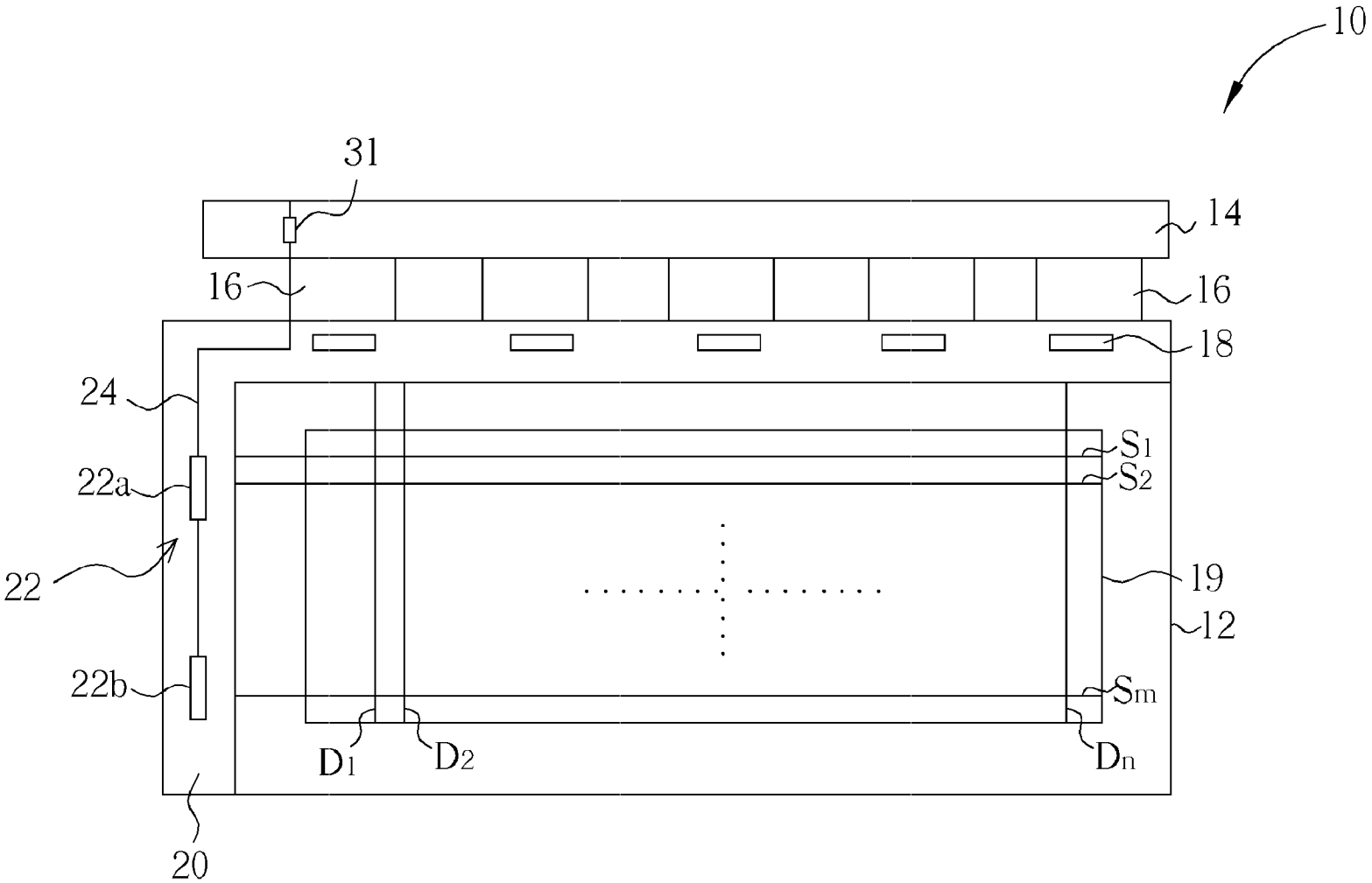
FIG. 4 PRIOR ART
FIG. 4 is a schematic diagram showing a conventional technique to resolve a band mura problem.
Figure 5:
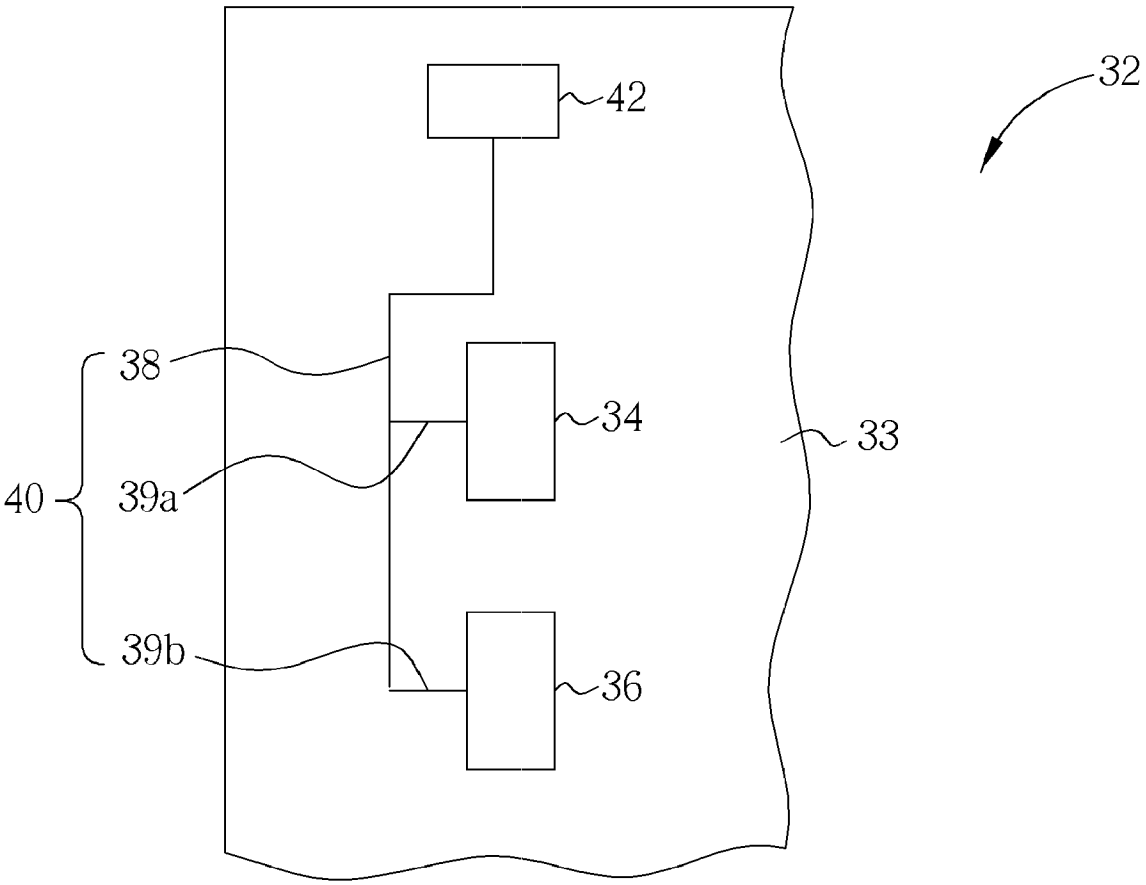
FIG. 5 is a schematic diagram showing a driving circuit of a liquid crystal display panel according to the present invention.

Please refer to FIG. 5. FIG. 5 is a schematic diagram showing a driving circuit of a liquid crystal display panel according to the present invention. As shown in FIG. 5, the driving circuit 32 of a liquid crystal display panel according to the present invention comprises a TFT substrate 33, two driver IC chips 34 and 36 positioned on the TFT substrate 33, a current supplier 42, and a conductive wire set 40 for connecting the driver IC chips 34 and 36 in parallel to the current supplier 42.

The conductive wire set 40 comprises a plurality of conductive wire segments. The form of each conductive wire segment is not particularly limited, as long as it can be laid out on the substrate and has the desired resistance such that driver IC chips arranged in parallel can each obtain an approximately identical input voltage. In FIG. 5, the conductive wire set 40 comprises a main wire segment 38 and two branch wire segments 39a and 39b. One end of the main wire segment is connected to the current supplier 42, and each of the branch wire segments 39a and 39b respectively connects the other end of the main wire segment 38 with one of the driver IC chips 34 and 36. Although the conductive wire segments are called as "main" or "branch", the shape or size, for example, length, width, or thickness, is not formed as being principal or subsidiary, as long as the conductive wire segments can connect each of the driver IC chips 34 and 36 in parallel to the current supplier. Therefore, the shape or size of conductive wire segments may have many variations and combinations that result in paths from the current supplier 42 to the driver IC chip 34 and from the current supplier 42 to the driver IC chip 36, having an approximately identical resistance. That is, the voltage drops for the respective paths from the current supplier 42 to the driver IC chips 34 and 36 should be approximately identical, thereby each driver IC chip can obtain a substantially identical input voltage.

The conductive wire may comprise conductive material, such as, metal, alloy, or indium tin oxide (ITO). The metal or alloy may be, but not limited to, aluminum, chromium, molybdenum, aluminum-neodymium (AlNd), and the like.

Figure 6:
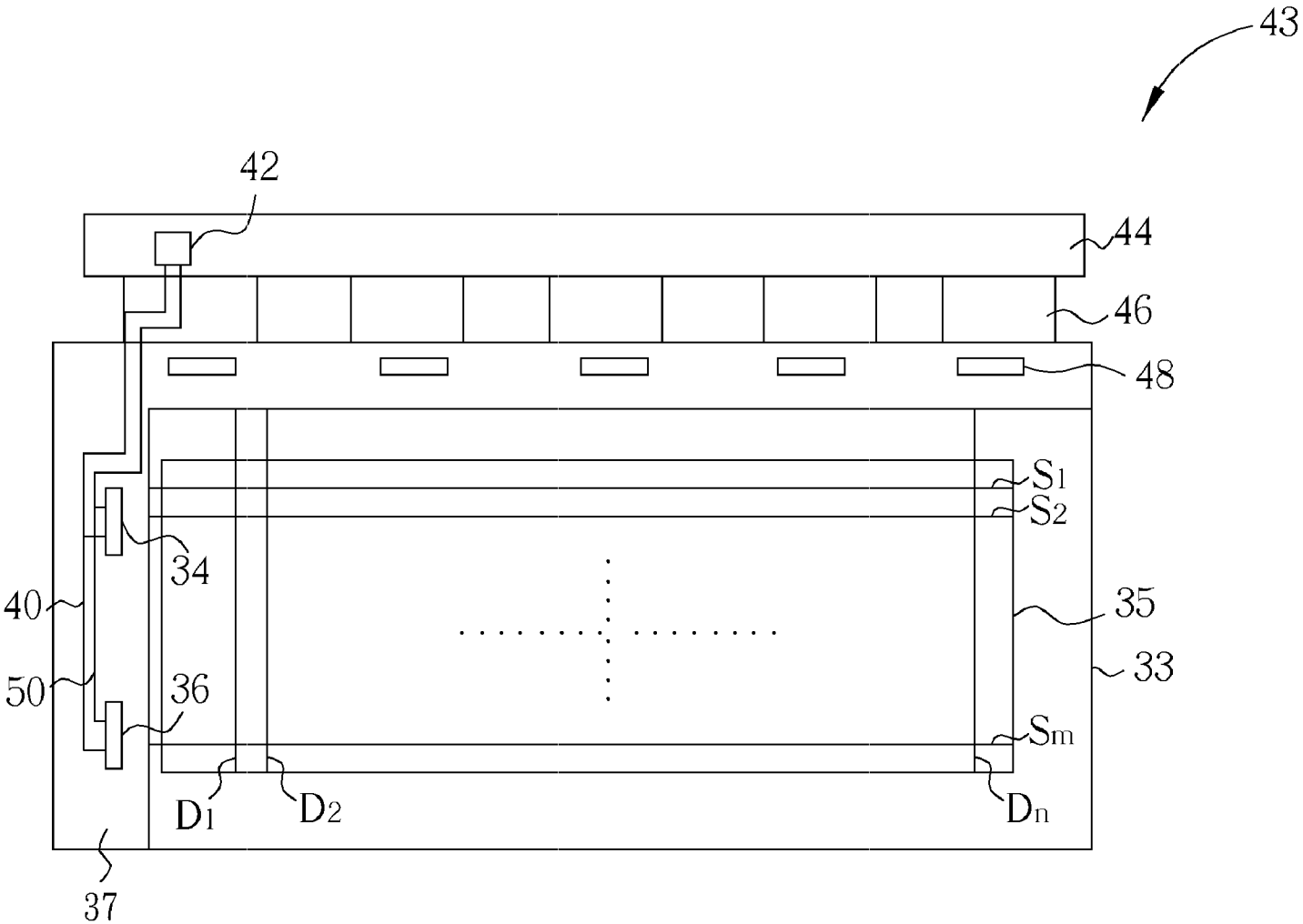
FIG. 6 is a schematic diagram showing a driving circuit of a liquid crystal display panel of one embodiment according to the present invention.

Please refer to FIG. 6 showing an application of the driving circuit according to the present invention to a liquid crystal display panel 43. The liquid crystal display panel 43 comprises a substrate 33 and a printed circuit board 44. A plurality of scanning lines $S_1$, $S_2$, . . . , and $S_m$ and a plurality of signal lines $D_1$, $D_2$, . . . , and $D_n$ are positioned on the substrate 33, m and n being a positive integer, to define a pixel matrix (not shown) in an active region 35 on the substrate 33. In addition, the substrate 33 further comprises an OLB 37 and gate driver IC chips 34 and 36 and conductive wire sets 40 and 50 on the OLB 37. The liquid crystal display panel 43 further comprises a plurality of flexible printed circuit board (FPC) 46 for electrically connecting the printed circuit board 44 and the substrate 33. Source driver IC chips 48 are positioned on the OLB 37 at the side of the substrate 33 connecting with the FPC 46. Current is output by a current supplier from the printed circuit board 44 and passes to the FPC 46.

The conductive wire set may be fabricated simultaneously with the fabrication of scanning lines on the substrate and comprise a same material as the scanning lines, fabricated simultaneously with the fabrication of signal lines on the substrate and comprise a same material as the signal lines, or fabricated simultaneously with the fabrication of pixel electrodes on the substrate and comprise a same material as the pixel electrodes. When the wires are used for conducting gate driver IC chips, it is preferably that the wires are fabricated simultaneously with the fabrication of scanning lines and comprise a same material as the scanning lines for convenience and having a relatively small resistance.

Please refer to FIG. 6 again. The driving circuit of a liquid crystal display panel according to the present invention may comprise a plurality of conductive wire sets, for example, two conductive wire sets 40 and 50. The conductive wire set 40 is described in detailed in the above description. The conductive wire set 50 is disposed in a similar way to the conductive wire set 40 and comprises a plurality of conductive wire segments, independent of the conductive wire set 40. The conductive wire set 50 may be the same as or different from the conductive wire set 40. The conductive wire set 50 must connect the driver IC chips 34 and 36 in parallel to the current supplier 42 and allow voltage drops for the respective paths from the current supplier 42 to the driver IC chips 34 and 36 to be approximately identical. Therefore, the shape or size of conductive wire segments may have many variations and combinations. In the embodiment shown by FIG. 6, the conductive wire set 40 may be set to carry an on-state current and the conductive wire set 50 may be set to carry an off-state current.

Figure 7:
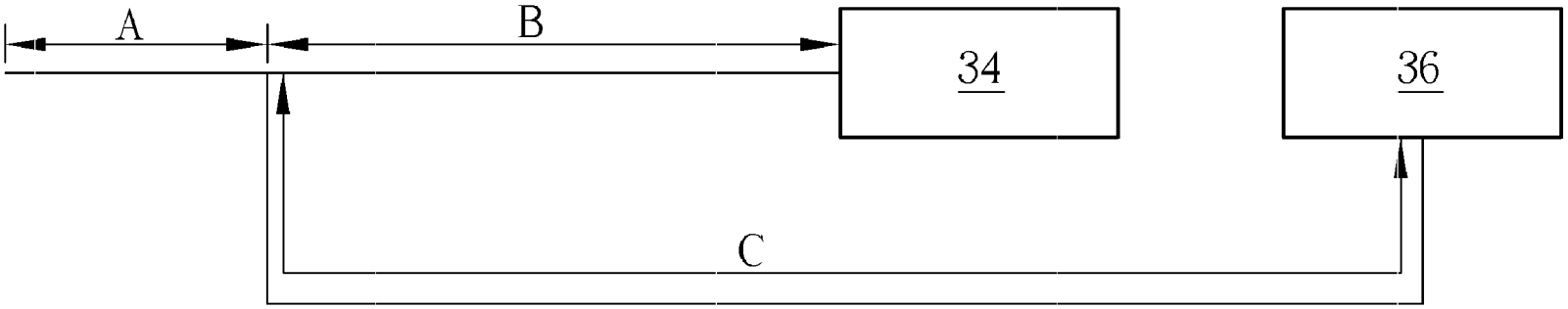
FIG. 7 is a schematic diagram showing a structure of a conductive wire set in the driving circuit of a liquid crystal display panel according to the present invention.

It is known that the resistance of a conductive wire is proportional to the length of the conductive wire per se, and inversely proportional to the cross section area of the conductive wire. Accordingly, the resistance of a conductive wire can be obtained by a simulative calculation. Therefore, in the present invention, for a predetermined resistance, there are may combinations for the shapes, such as the length, width, and thickness, of conductive wire segments in the conductive wire set to approach the desired resistance. Please refer to FIG. 7 showing a structure of a conductive wire set in the driving circuit of a liquid crystal display panel of an embodiment according to the present invention. The conductive wire set comprises conductive wire segments A, B, and C. One end of the conductive wire segment B connects to the conductive wire segment A and the other end connects to the driver IC chip 34. One end of the conductive wire segment C connects to the conductive wire segment A and the other end connects to the driver IC chip 36. Two examples of possible combinations for the length, width, thickness and material for conductive wire segments A, B, and C are shown in tables in FIGS. 8 and 9, respectively. As the combinations of the conductive wire segments shown in the tables, they are suitable to be a conductive wire set for TFT on-state voltage ($V_{gg}$) or off-state voltage ($V_{ee}$) transmission.

Furthermore, the present invention is not limited to the above-mentioned driving circuit for outputting switch/addressing signals to the scanning lines, and a driving circuit for outputting image information signals to the signal lines is also encompassed.

As compared to the conventional method, in which a resistor is added at the signal input position on the printed circuit board to make the input signal to have an oscillating distortion to resolve the band mura phenomenon, in the present invention, an additional resistor is not needed, thus the power consumption is not increased. In the present invention, the resistance existing on the wiring path from each driver IC chip to the current supplier is approximately identical, thus each driver IC chip receives an approximately identical voltage to avoid the band mura problem and the display quality is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit of a liquid crystal display panel, comprising:

a substrate;

a plurality of driver IC chips positioned on the substrate;

a current supplier; and a first conductive wire set comprising [a] conductive wire [for] *paths* electrically connecting *each of* the *plurality of* driver IC chips in parallel to the current supplier, *wherein each conductive wire path electrically connecting one of the plurality of IC chips in parallel to the current supplier has approximately equal resistance, wherein a first of the conductive wire paths electrically connecting a first IC chip to the current supplier comprises a first wire segment and a second wire segment, and wherein a second of the conductive wire paths electrically connecting a second IC chip to the current supplier comprises the first wire segment and a third wire segment*.

2. The driving circuit of claim 1, wherein the conductive wire [and the driver IC chips are electrically connected by] *paths comprise* a plurality of conductive wire segments, and *each conductive wire segment of* the *plurality of* conductive wire segments [each have] *has* a form, such that [paths formed of the conductive wire segments from the current supplier to the respective driver IC chips each have an equal resistance and] each of the *plurality of* driver IC chips [obtain] *obtains* a same input voltage *from the current supplier*.

3. The driving circuit of claim 1, wherein the first conductive wire set comprises a metal layer, alloy layer, or indium tin oxide (ITO) layer.

4. The driving circuit of claim 1, wherein the substrate further comprises a plurality of scanning lines and a plurality of signal lines.

5. The driving circuit of claim 4, wherein the *plurality of* driver IC chips *are configured to* output switch/addressing signals to the *plurality of* scanning lines.

6. The driving circuit of claim 4, wherein the *plurality of* driver IC chips *are configured to* output image information signals to the *plurality of* signal lines.

7. The driving circuit of claim 4, wherein the first conductive wire set comprises a same material as the *plurality of* scanning lines.

8. The driving circuit of claim 4, wherein the first conductive wire set comprises a same material as the *plurality of* signal lines.

9. [The] *A* driving circuit of [claim 1] *a liquid crystal display panel,* [further comprises1]** *comprising:*

*a substrate;*

*a plurality of driver IC chips positioned on the substrate;*

*a current supplier;*

*a first conductive wire set arranged to electrically connect a first of the plurality of driver IC chips to the current supplier, the first conductive wire set comprising a first wire segment and a second wire segment; and* a second conductive wire set [comprising a conductive wire for] *arranged to* electrically [connecting] *connect a second of* the *plurality of* driver IC chips [in parallel] to the current supplier, *the second conductive wire set comprising the first wire segment and a third wire segment,*

*wherein the second wire segment has a length and a cross section that are different than a length and a cross section of the third wire segment such that the first conductive wire set and the second conductive wire set have approximately equal resistance.*

10. The driving circuit of claim 9, wherein [the conductive wire included in the second conductive wire set and each of the driver IC chips are electrically connected by a conductive wire segment, and] the *first, second, and third* conductive wire segments each have a form, such that [paths formed of the second conductive wire segments from the current supplier to the respective driver IC chips have an equal resistance and] each of the *plurality of* driver IC chips [obtain] *obtains* a same input voltage.

11. The driving circuit of claim 9, wherein the first *and second* conductive wire [set carries] *sets carry at least one of* a thin film transistor on-state current and [the second conductive wire set carries] a thin film transistor off-state current.

12. The driving circuit of claim 9, wherein the second conductive wire set comprises a metal layer, alloy layer, or indium tin oxide (ITO) layer.

13. The driving circuit of claim 9, wherein the substrate further comprises a plurality of scanning lines and a plurality of signal lines.

14. The driving circuit of claim 13, wherein the *plurality of* driver IC chips *are configured to* output switch/addressing signals to the *plurality of* scanning lines.

15. The driving circuit of claim 13, wherein the *plurality of* driver IC chips *are configured to* output image information signals to the *plurality of* signal lines.

16. The driving circuit of claim 13, wherein the second conductive wire set comprises a same material as the *plurality of* scanning lines.

17. The driving circuit of claim 13, wherein the second conductive wire set comprises a same material as the *plurality of* signal lines.

*18. A driving circuit of a liquid crystal display panel, comprising:*

*a substrate;*

*a current supplier;*

*a first driver IC chip positioned on the substrate; and*

*a second driver IC chip positioned on the substrate,*

*wherein the first and second driver IC chips are electrically connected to the current supplier in parallel via a first wire set electrically connecting the first driver IC chip and the second driver IC chip to the current supplier in parallel, and a second wire set electrically connecting the first driver IC chip and the second driver IC chip to the current supplier in parallel,*

*wherein the first wire set is physically distinct from the second wire set, and*

*wherein the first wire set is configured to carry a first current to each of the first and second driver IC chips, wherein the second wire set is configured to carry a second current to each of the first and second driver IC chips, and wherein the first current is different from the second current.*

*19. The driving circuit of claim 18, wherein at least one of the first and second wire sets comprises a first electrical connection from the current supplier to the first driver IC chip and a second electrical connection from the current supplier to the second driver IC chip, and wherein the first electrical connection is configured to provide the first driver IC chip with a first input voltage and the second electrical connection is configured to provide the second driver IC chip with a second input voltage that is substantially the same as the first input voltage.*

*20. The driving circuit of claim 18, wherein at least one of the first and second wire sets comprises a first electrical connection from the current supplier to the first driver IC chip and a second electrical connection from the current supplier to the second driver IC chip, and wherein the first electrical connection has a first electrical resistance and wherein the second electrical connection has a second electrical resistance that is substantially the same as the first electrical resistance.*

*21. The driving circuit of claim 18, wherein:*

*at least one of the first and second wire sets comprises a first electrical connection from the current supplier to the first driver IC chip and a second electrical connection from the current supplier to the second driver IC chip;*

*the first electrical connection comprises a main wire segment and a first branch wire segment; and*

*the second electrical connection comprises the main wire segment and a second branch wire segment.*

*22. The driving circuit of claim 18, wherein the substrate comprises a plurality of scanning lines and a plurality of signal lines.*

*23. The driving circuit of claim 22, wherein the first driver IC chip and the second driver IC chip are each configured to output signals to one or more of the plurality of scanning lines.*

*24. The driving circuit of claim 18, wherein:*

*the first wire set comprises a first electrical connection from the current supplier to the first driver IC chip and a second electrical connection from the current supplier to the second driver IC chip;*

*the second wire set comprises a third electrical connection from the current supplier to the first driver IC chip and a fourth electrical connection from the current supplier to the second driver IC chip;*

*the first electrical connection is configured to provide the first driver IC chip with a first input voltage;*

*the second electrical connection is configured to provide the second driver IC chip with an input voltage that is substantially the same as the first input voltage;*

*the third electrical connection is configured to provide the first driver IC chip with a second input voltage; and*

*the fourth electrical connection is configured to provide the second driver IC chip with an input voltage that is substantially the same as the second input voltage.*

*25. The driving circuit of claim 18, wherein:*

*the first wire set comprises a first electrical connection from the current supplier to the first driver IC chip and a second electrical connection from the current supplier to the second driver IC chip;*

*the second wire set comprises a third electrical connection from the current supplier to the first driver IC chip and a fourth electrical connection from the current supplier to the second driver IC chip;*

*the first electrical connection has a first electrical resistance;*

*the second electrical connection has an electrical resistance that is substantially the same as the first electrical resistance;*

*the third electrical connection has a second electrical resistance; and*

*the fourth electrical connection has an electrical resistance that is substantially the same as the second electrical resistance.*

*26. The driving circuit of claim 18, wherein:*

*the first wire set comprises a first electrical connection from the current supplier to the first driver IC chip and a second electrical connection from the current supplier to the second driver IC chip;*

*the second wire set comprises a third electrical connection from the current supplier to the first driver IC chip and a fourth electrical connection from the current supplier to the second driver IC chip;*

*the first electrical connection comprises a first main wire segment and a first branch wire segment;*

*the second electrical connection comprises the first main wire segment and a second branch wire segment;*

*the third electrical connection comprises a second main wire segment and a third branch wire segment; and*

*the fourth electrical connection comprises the second main wire segment and a fourth branch wire segment.*

*27. The driving circuit of claim 18, wherein the first current is an on-state current and the second current is an off-state current.*

* * * * *